(12) United States Patent
Kurosawa

(10) Patent No.: US 7,697,840 B2
(45) Date of Patent: Apr. 13, 2010

(54) DISPLAY SCREEN DEVICE

(75) Inventor: Yuichi Kurosawa, Tokyo (JP)

(73) Assignee: Hoya Corporation, Tokyo (JP)

( * ) Notice: Subject to any disclaimer, the term of this patent is extended or adjusted under 35 U.S.C. 154(b) by 860 days.

(21) Appl. No.: 11/459,390

(22) Filed: Jul. 24, 2006

(65) Prior Publication Data
US 2007/0019002 A1    Jan. 25, 2007

(30) Foreign Application Priority Data
Jul. 25, 2005    (JP) ............................ 2005-214992

(51) Int. Cl.
*G03B 13/02* (2006.01)

(52) U.S. Cl. .................. 396/384; 396/287; 396/373; 345/629

(58) Field of Classification Search ................ 345/629; 396/287, 373
See application file for complete search history.

(56) References Cited

U.S. PATENT DOCUMENTS

| | | | | |
|---|---|---|---|---|
| 6,130,665 | A * | 10/2000 | Ericsson | 345/173 |
| 6,600,527 | B1 * | 7/2003 | Basturk et al. | 349/74 |
| 6,721,023 | B1 * | 4/2004 | Weiss et al. | 349/87 |
| 6,738,577 | B1 * | 5/2004 | Maeda et al. | 396/287 |
| 6,980,247 | B1 * | 12/2005 | Kodama et al. | 348/333.01 |
| 7,205,959 | B2 * | 4/2007 | Henriksson | 345/4 |
| 2004/0201699 | A1 * | 10/2004 | Parulski et al. | 348/207.99 |
| 2004/0239582 | A1 * | 12/2004 | Seymour | 345/5 |
| 2005/0062410 | A1 * | 3/2005 | Bell et al. | 313/506 |

FOREIGN PATENT DOCUMENTS

| | | |
|---|---|---|
| JP | 2000-137268 | 5/2000 |
| JP | 3539251 | 4/2004 |

OTHER PUBLICATIONS

English Language Abstract of JP 2000-137268.
English Language Abstract corresponding to JP Publication No. 2000-180935.
U.S. Appl. No. 11/459,158 to Kurosawa, filed Jul. 21, 2006.

* cited by examiner

*Primary Examiner*—Richard Hjerpe
*Assistant Examiner*—Gregory J Tryder
(74) *Attorney, Agent, or Firm*—Greenblum & Bernstein, P.L.C.

(57) ABSTRACT

A display screen device includes a display panel on which a first image is displayed, and an electroluminescent display which displays a second image and is positioned to extend substantially entirely over one surface of the display panel so that the first image and the second image can be selectively displayed and so that the first image and the second image can be displayed in a superimposed manner.

8 Claims, 9 Drawing Sheets

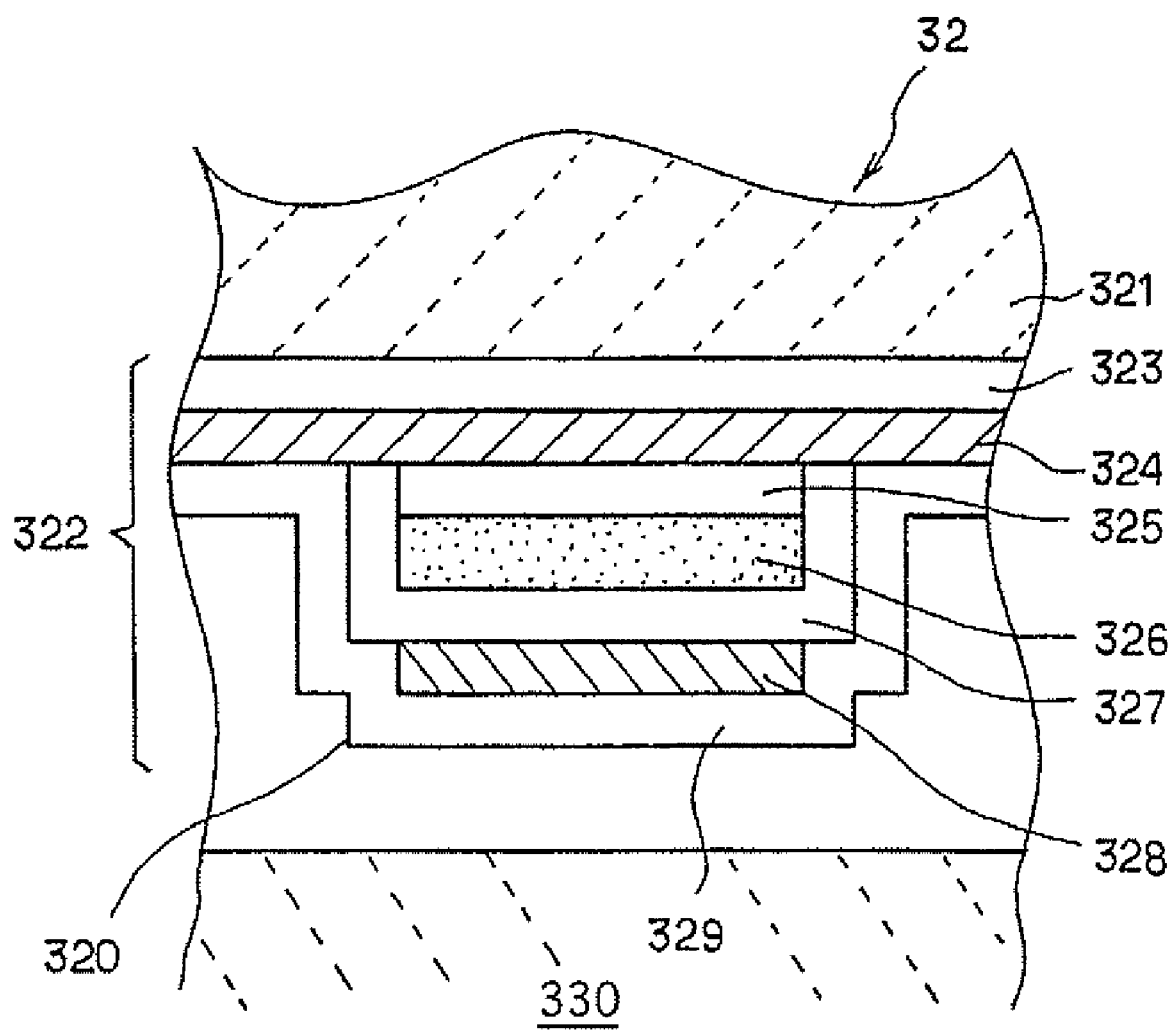

DISPLAY SCREEN DEVICE

BACKGROUND OF THE INVENTION

1. Field of the Invention

The present invention relates to a screen upon which an image (as a picture or information) is projected to display the image on the screen, and more specifically, relates to a display screen which can either selectively display a plurality of images thereon or display a plurality of images in a manner so as to overlay one image on another.

2. Description of the Prior Art

In regard to a display screen for displaying an image, a projection display screen and a transmissive display screen are two possible types. A projection display screen consists of a blank surface and a support structure used with, e.g., a projector. A transmissive display screen consists of a transparent plate a surface of which is formed as a milk-white (translucent-white) surface. For instance, a transmissive display screen is often used as a focusing screen, which serves as an optical element of an single-lens-reflex camera, or a display screen of a liquid crystal display (LCD) or a cathode-ray tube (CRT). The focusing screen is made of a transparent resin plate, a surface of which is roughened (formed to be a light-diffusing surface) to allow a real image of an object to be formed on the roughened surface so that the real image can be viewed due to an optical effect at the roughened surface.

Conventionally, various photographic information are displayed on the focusing screen using a display device so as to be visually readable together with (or separately from) an object image (optical image) formed on the focusing screen. An LCD is generally used as such a display device. Visual information displayed on the LCD is formed at a position on an optical axis which is optically equivalent to the position of the focusing screen by an optical device. In Japanese unexamined patent publication 2000-137268 and Japanese patent publication No. 3539251, a device for displaying required images on the focusing screen using an EL (electroluminescent) display instead of an LCD has been proposed. Specifically, in the former publication, forming an EL display in a peripheral part of the object image forming area (picture area) of a focusing screen and making the EL display indicate required information by making an EL drive circuit drive the EL display makes it possible to view either only the required information or the required information together with an object image displayed on the focusing screen through a viewfinder. Furthermore, the latter publication discloses a system wherein an EL display is overlaid on a focusing screen to display a picture frame on the focusing screen. In the former publication, a system wherein an EL display is provided on a surface of a prism serving as an element of a viewfinder optical system has also been proposed.

In either a conventional projection display screen or a conventional transmissive display screen, the display screen is used to display only one image, and it is difficult to display different images in a manner to overlay (superimpose) one image on another. Although an object image and visual information can be simultaneously displayed by an arrangement in which an EL display is disposed on an image forming surface of either a focusing screen or a prism in the system disclosed in the former publication, an object image and visual information cannot be displayed simultaneously in an superimposed manner because the EL display is disposed outside of the effective field of view, in which an object image is displayed. In addition, images displayed on the focusing screen are limited to object images which are formed via a photographing lens because the EL display displays only visual information. On the other hand, although an image displayed on the EL display is displayed to be superimposed on an object image on the focusing screen in the system disclosed in the latter publication, the system disclosed in the latter publication is the same as that in the former publication in that images displayed by the EL display are limited since the image displayed by the EL display are unchangeable images which are predetermined beforehand. Therefore, in either of the former and latter publications, the degree of flexibility in images displayed on the display screen is low.

SUMMARY OF THE INVENTION

The present invention provides a display screen device which is constructed to be capable of displaying a plurality of images in a manner to overlay one image on another image. For instance, in the case where the present invention is applied to a focusing screen of a camera, the present invention provides a display screen device which is constructed to be capable of displaying optical images of an object, images captured by an image pickup device and/or various visual information in a manner to overlay one image on another.

According to an aspect of the present invention, a display screen device is provided, including a display panel on which a first image is displayed; and an electroluminescent display which displays a second image and is positioned to extend substantially entirely over one surface of the display panel so that the first image and the second image can be selectively displayed and so that the first image and the second image can be displayed in a superimposed manner.

It is desirable for the display panel to include a light-transmissive image forming plate on which an optical image is formed.

It is desirable for the electroluminescent display to be formed on a transparent substrate so as to constitute a color display.

It is desirable for the electroluminescent display to be transparent when no voltage is applied thereto.

It is desirable for the light-transmissive image forming plate to be formed to serve as an element of a focusing screen of a camera.

It is desirable for an image forming surface of the image forming plate on which the optical image is formed to be roughened to serve as a light-diffusing surface, and for the electroluminescent display to be in contact with the light-diffusing surface.

It is desirable for an image forming surface of the image forming plate on which the optical image is formed is roughened to serve as a light-diffusing surface, and for the electroluminescent display is integrally formed with the light-diffusing surface.

It is desirable for the camera to include an image pickup device for capturing an object image formed via a photographing lens, and for the electroluminescent display to display the object image, which is taken by the image pickup device, as the second image.

It is desirable for the image forming plate to include one of a lens element and a prism that serve as optical elements of a viewfinder optical system of a camera.

It is desirable for the display panel to include a front panel of a display monitor.

It is desirable for the display panel to include a screen upon which an image is projected by a projector.

It is desirable for the display panel to include a light-transmissive image forming plate having a recess, a inner surface of which is formed to be a light-diffusing surface, wherein the electroluminescent display is formed on a transparent substrate so as to include a color display, the transparent substrate being embedded in the recess with the electroluminescent display facing the light-diffusing surface.

According to the present invention, various displaying methods are possible since the first image that is displayed on the display panel and the second image that is displayed by the electroluminescent-pixel array (electroluminescence display (panel), thin-film light-emitting diode display) can be displayed independently of each other or in a manner to overlay (superimpose) one image on another. For instance, an image displayed by the electroluminescent-pixel array can be superimposed on an optical image or can be superimposed on an image displayed by an LCD or a CRT. Moreover, an image displayed by the electroluminescent-pixel array can be superimposed on an image projected onto a screen by a projector. These configurations make it possible to increase the variety of display patterns on the display screen device to thereby enhance the convenience of the display screen device.

The present disclosure relates to subject matter contained in Japanese Patent Application No. 2005-214992 (filed on Jul. 25, 2005) which is expressly incorporated herein in its entirety.

BRIEF DESCRIPTION OF THE DRAWINGS

The present invention will be discussed below in detail with reference to the accompanying drawings, in which:

FIG. 5 is an enlarged cross sectional view of an electroluminescent portion of the focusing screen shown in FIG. 2;

DESCRIPTION OF THE PREFERRED EMBODIMENTS

First Embodiment

Figure 1:
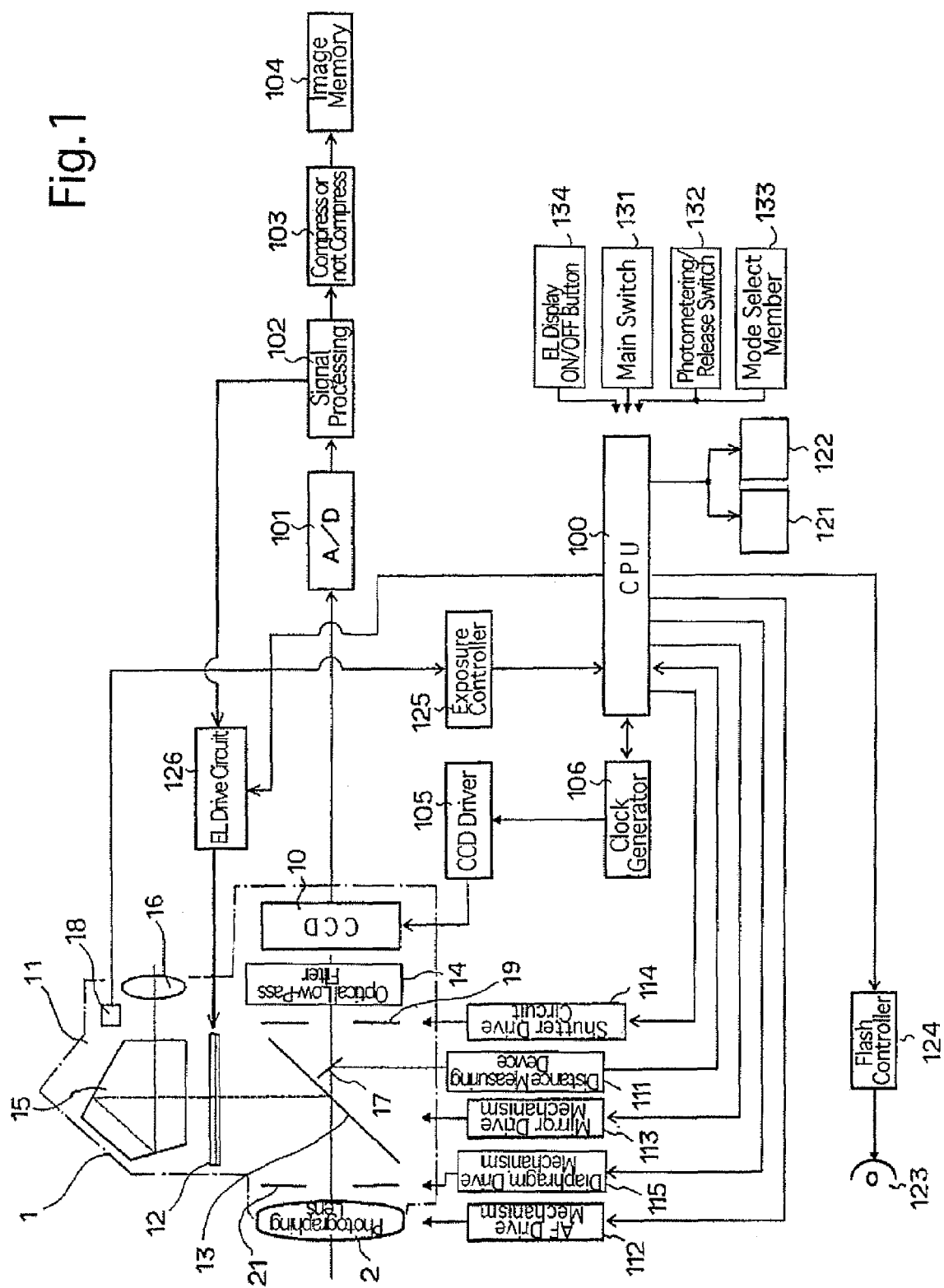
FIG. 1 is a block diagram of components of a digital camera having a first embodiment of a display screen device according to the present invention.

FIG. 1 is a block diagram of components of an SLR (single lens reflex) digital camera having a first embodiment of a display screen device, according to the present invention, which is applied to a viewfinder optical system of the digital camera. The SLR digital camera is provided with a camera body 1 (shown by a one-dot chain line in FIG. 1) and a photographing lens 2 detachably attached to the camera body 1. The camera body 1 is provided therein with an image pickup device (CCD) 10, a view finder optical system 11 and a main mirror (quick-return mirror) 13. The image pickup device 10 is used to pickup an object image formed via the photographing lens 2, the viewfinder optical system 11 is used to view the object image, and the main mirror 13 is used to form the object image on a focusing screen (display screen device) 12 of the viewfinder optical system 11. The camera body 1 is provided therein in front of the image pickup device 10 with an optical low-pass filter 14. The viewfinder optical system 11 is provided above the focusing screen 12 with a pentagonal prism 15 and an eyepiece 16. The camera body 1 is provided, immediately behind a half-mirror portion formed at a central portion of the main mirror 13, with a second mirror 17 which reflects the incident light toward a distance measuring device 111 so that the distance measuring device 111 can operate to measure an object distance. The camera body 1 is provided at a position adjacent to the pentagonal prism 15 with a photometering element 18.

In the SLR digital camera, an object image formed via the photographing lens 2 is reflected by the main mirror 13 to be formed on the focusing screen 12, and subsequently the object image formed on the focusing screen 12 is reflected by the pentagonal prism 15 so that the photographer can view the object image as an erect image through the eyepiece 16. Upon a focal plane shutter 19 that is positioned behind the main mirror 13 being opened when the main mirror 13 has been lifted to the upper position (retracted position), an object image formed via the photographing lens 2 is captured by the image pickup device 10 so that the photographer can visually check the object image that is obtained via predetermined signal processing (which will be discussed in detail later) through an external monitoring LCD 122. In addition, the image that is obtained via the predetermined signal processing is displayed on the focusing screen 12 so that the photographer can also see the image through the eyepiece 16 for a predetermined period of time upon a shutter release, details of which will be discussed later.

Figure 2:
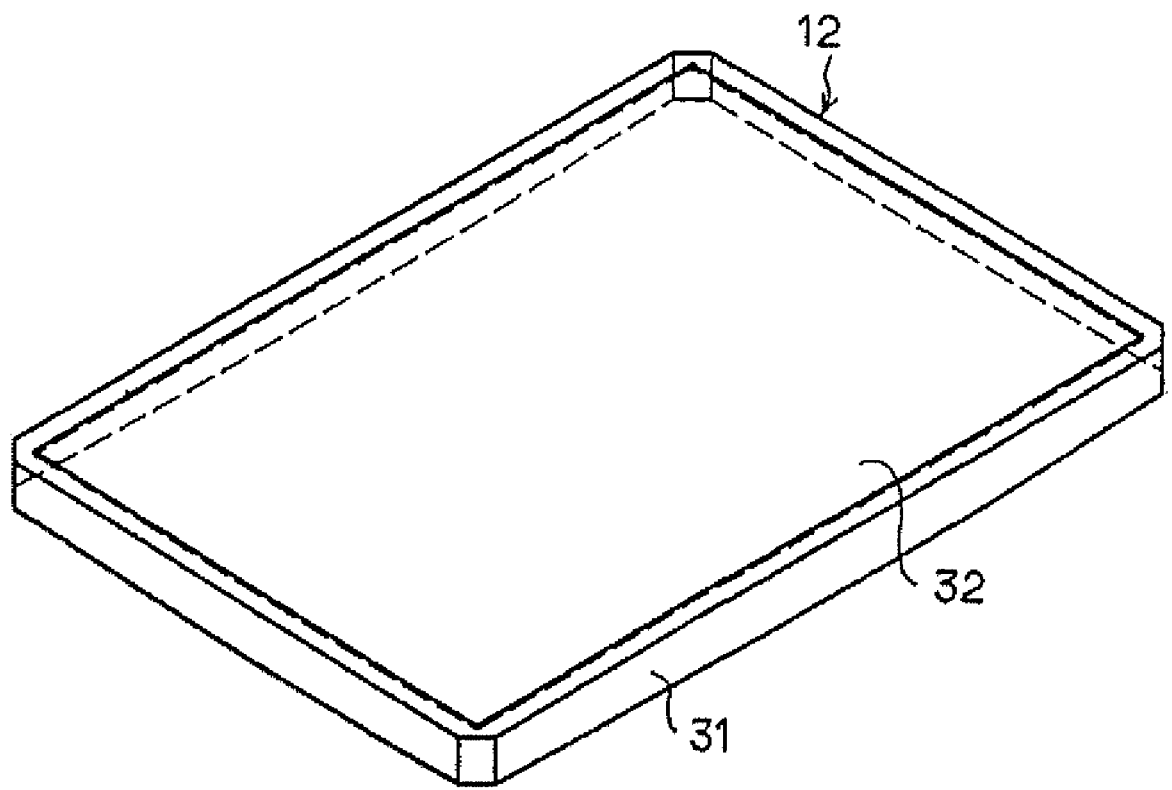
FIG. 2 is a perspective external view of the focusing screen (display screen device) shown in FIG. 1.
Figure 3:
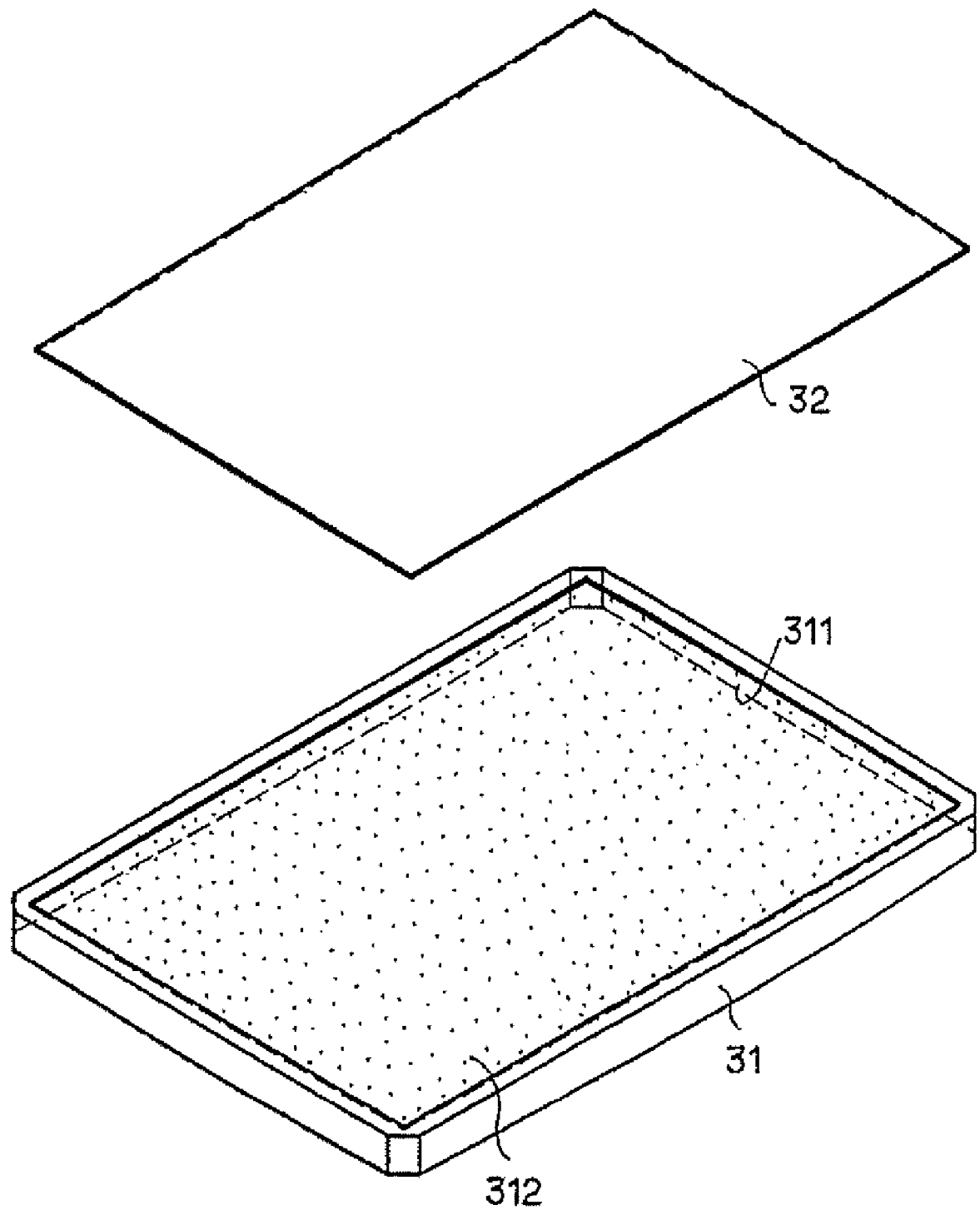
FIG. 3 is an exploded perspective view of the focusing screen shown in FIG. 3.
Figure 4A:
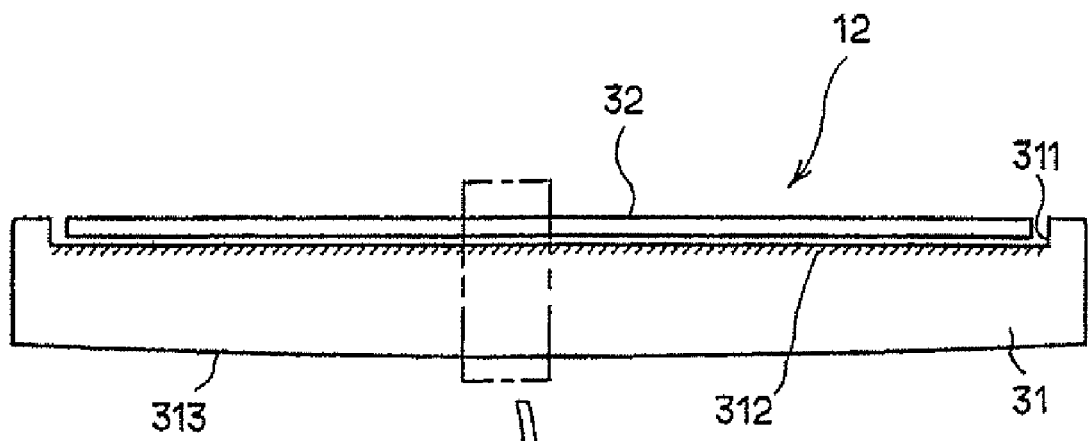
FIG. 4A is a cross sectional view of the focusing screen shown in FIG. 2.
Figure 4B:
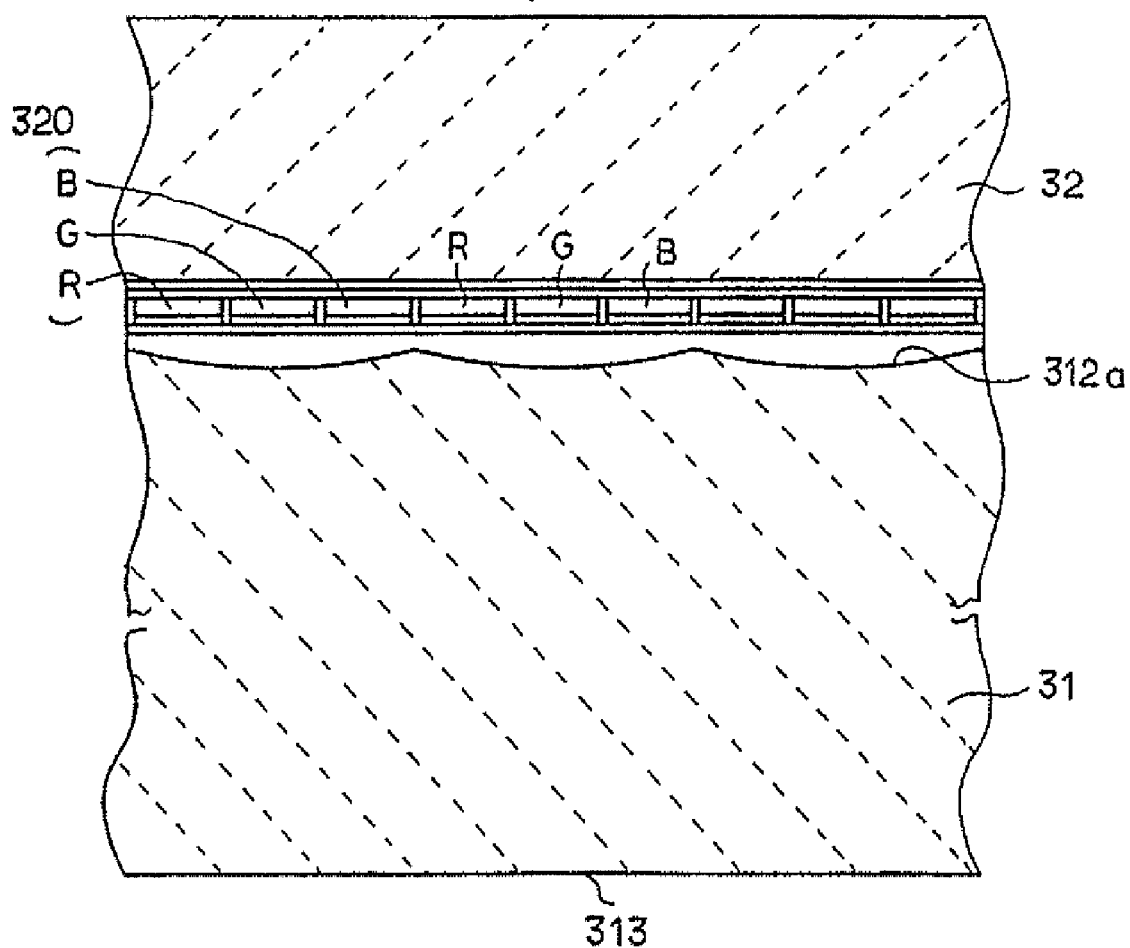
FIG. 4B is an enlarged cross sectional view of a portion of the focusing screen shown in FIG. 4A.

FIG. 2 is a perspective external view of the focusing screen 12, FIG. 3 is an exploded perspective view of the focusing screen 12 and FIGS. 4A and 4B are cross sectional views of the focusing screen 12. The focusing screen 12 is provided with a rectangular image forming plate (display panel/light-transmissive image forming plate) 31 and a rectangular EL display 32 which is formed to extend over substantially the entire front surface (upper surface as viewed in FIGS. 1, 3, 4A and 4B) of the image forming plate 31 except the peripheral edge of the front surface thereof. The EL display 32 is embedded in a shallow recess 311 formed on the front surface of the image forming plate 31. The image forming plate 31 is made of a transparent resin plate (e.g., PMMA (acrylic resin) or PC (polycarbonate resin)) having a thickness of approximately 1 millimeter, a front surface of the image forming plate 31 (specifically the bottom surface in the recessed portion 311) is formed to be a light diffusing surface 312 that allows the photographer to see an image formed on the light diffusing surface 312. Specifically, the light diffusing surface 312 is made by roughening the front surface of the image forming plate 31 (the bottom surface in the recessed portion 311) by forming thereon microscopic asperities 312a in the size range of approximately two micrometers. The image forming plate 31 is formed to also serve as an optical condenser; a back surface 313 (lower surface as viewed in FIGS. 4A and 4B) of the image forming plate 31 is formed as a lens surface or a Fresnel lens surface.

The EL display 32 is constructed as a full-color EL display and is provided thereon with a matrix of red (R), green (G) and blue (B) pixels 320 arranged in a plane. As shown in FIG. 5 that shows a portion of one pixel 320, each pixel 320 has a multilayer structure. As shown in FIG. 5, the EL display 32 is provided with a transparent EL substrate (transparent substrate) 321, a transparent outer film 330 and an EL portion 322. The transparent EL substrate 321 is made of a transparent film and serves as a film base of the EL display 32. The EL portion 322 is made of the aforementioned array of pixels 320 arranged two-dimensionally on a surface (lower surface as viewed in FIG. 5) of the transparent EL substrate 321. A moisture-proof barrier film 323 is formed on the lower surface of the transparent EL substrate 321 and a transparent substrate-side electrode film 324 is formed on the lower surface of the moisture-proof barrier film 323. In addition, an insulating layer 325, a luminous layer 326 and an insulating layer 327 are layered in that order on the substrate-side electrode film 324 to correspond to each pixel 320. The substrate-side electrode film 324 is a transparent film made of ITO (Indium Tin Oxide), has a thickness of 25 to 100 nanometers and is formed on the moisture-proof barrier film 323 in a predetermined pattern. Additionally, a transparent front-side electrode 328 is formed on the insulating layer 327, and thereafter the remaining outer surfaces of the substrate-side electrode film 324, the insulating layer 325 and the front-side electrode 328 are fully coated with a moisture-proof barrier layer 329. The front-side electrode 328 is a transparent film made of IZO (Indium Zinc Oxide) and has a thickness of 25 to 100 nanometers. In the EL display 32, each luminous layer 326 emits light (red, green and/or blue lights) by applying a high-strength electric field to the luminous layer 326 by applying a predetermined voltage between the substrate-side electrode film 324 and the front-side electrode 328. Therefore, selectively making the desired pixels 320 emit light makes it possible to bring the EL display 32 to display a desired color pattern (color image). The EL display 32 remains transparent when no voltage is applied between the substrate-side electrode film 324 and the front-side electrode 328.

The transparent EL substrate 321 is formed a transparent resin film made of, e.g., one of the following resin materials: PET (polyethylene terephthalate), PES (polyethersulfone), PAr (Polyarylate) and PC (polycarbonate), with a thickness of approximately 75 micrometers. Each of the insulating layers 325 and 327 is formed a silicon dioxide film having a thickness of 0.2 to 0.3 micrometers, while each of the moisture-proof barrier films 323 and 329 is formed from a silicon nitride film having the same degree of thickness as each of the insulating layers 325 and 327. The luminous layer 326 has a thickness of 0.5 to 1.0 micrometers. If the luminous layer 326 is made as inorganic EL, the red pixel is made of CaS:Eu, ZnS:Sm and the like, the green pixel is made of Zn:Tb and the like and the blue pixel is made of SrS:Ce, $CaGa_2S_4$:Ce and the like. If the luminous layer 326 is made as organic EL, the red pixel is made of $Eu(DBM)_3(Phen)$ (Eu complex), the green pixel is made of Alq (Tris(8-quinolinolato)aluminum) and the blue pixel is made of DPVBi (distyrylarylene derivative).

The EL display 32 having the above described structure is embedded in the recess 311 of the image forming plate 31 with the front side (the lower side as viewed in FIGS. 4A and 4B) of the EL display 32 facing the rear surface of the image forming plate 31. A transparent sealant (not shown) is filled in the gap between the recessed portion of the image forming plate 31 and the EL display 32 to seal the gap therebetween and to form the image forming plate 31 and the EL display 32 integral with each other to thereby constitute the focusing screen 12. At this time, the EL display 32 is positioned either closely to or in contact with the light diffusing surface 312. Accordingly, the image forming surface of the image forming plate 31 and the front surface (the bottom surface as viewed in FIGS. 4A and 4B) of the EL display 32 are positioned substantially at the same position on an optical axis, so that the image forming plate 31 and the EL display 32 can be positioned at a focal point of the eyepiece 16. Additionally, no Newton rings occur between the image forming plate 31 and the EL display 32 because a surface of the image forming plate 31 which faces the EL display 32 is roughened to serve as the light diffusing surface 312.

Referring to the block diagram shown in FIG. 1, an image signal of an object which is obtained by an image pickup device 10 is converted into a digital image signal by an A/D converter 101. This digital image signal is subjected to predetermined signal processing such as color processing and a gamma control processing in a signal processing circuit 102. Subsequently, this processed digital signal is compressed or not compressed in a compressing circuit 103 before being written into a VRAM (image memory) 104. It is possible to set an accumulation time (integral action time) at the image pickup device 10 at a time of exposure by controlling a CCD driver 105 via a clock generator 106 by a CPU 100.

The CPU 100 controls the operation of an AF (autofocus) drive mechanism 112 based on an object distance measured by a distance measuring device 111 when an object image is taken (picked up). Additionally, the CPU 100 controls the operation of a mirror drive mechanism 113 to drive the main mirror 13, and the CPU 100 controls the operation of a shutter drive circuit 114 to open and shut the focal plane shutter 19. At the same time, the CPU 100 controls the operation of a diaphragm drive mechanism 115 to stop down a diaphragm 21. In addition, the CPU 100 operates to make a photographing-information indication LCD 121 and the external monitoring LCD 122 display required data. The CPU 100 also controls the operation of a flash controller 124 for controlling the discharge of a flash 123. Additionally, the CPU 100 controls the operation of an exposure controller 125 based on a photometric signal output from the photometering element 18.

Information on the operation of the main switch 131, ON/OFF switch information on a combination photometering/release switch 132 including a photometering switch and a release switch which are turned ON when a release button (not shown) is halfway and fully depressed, respectively, and mode information on selected modes which are manually selected with a mode select member 133 are all input to the CPU 100. As such mode information, "optical image display mode," "image-pickup monitor-display mode" and "image-pickup finder-display mode", can be selected. Additionally, information on the operation of an EL display ON/OFF button 134 is input to the CPU 100 so that the EL display 32 can display a required image (a object image or information) for a short period of time. The camera body 1 is further provided therein with an EL drive circuit 126 which drives the EL display 32 that is integral with the focusing screen 12 to make the EL display 32 display a required image. It is possible that the CPU 100 make the EL drive circuit 126 operate so that the EL display 32 displays a required image upon the mode select member 133 or the EL display ON/OFF button 134 being operated.

Operations of the SLR digital camera having the above described structure, i.e., operations for displaying object images on the focusing screen 12, will be discussed hereinafter. When the mode select member 133 is set to the "optical image display mode" position, the CPU 100 does not actuate the EL drive circuit 126, so that the EL drive circuit 126 does not drive the EL display 32. At this time, the EL display 32 is in a transparent state. An object image formed via the photographing lens 2 is reflected by the main mirror 13 to be formed on the light diffusing surface 312 of the image forming plate 31 of the focusing screen 12. This object image formed on the light diffusing surface 312 passes through the EL display 32 which is in a transparent state to be capable of being viewed through the pentagonal prism 15 and the eyepiece 16, so that the photographer can take pictures of the object image while viewing the object image through the viewfinder optical system 11. Namely, the present embodiment of the SLR digital camera can be used to photograph just like a conventional SLR digital camera.

When the mode select member 133 is set to the "image-pickup monitor-display mode" position, the main mirror 13 moves upward, and the object image formed via the photographing lens 2 is captured via the image pickup device 10. This object image (image signal) is converted into a digital image signal by the A/D converter 101 and subsequently this digital image signal is subjected to predetermined signal processing in the signal processing circuit 102 so as to become a processed image signal. This processed image signal is displayed as a visual object image on the external monitoring LCD 122 that is provided on the back of the camera body 1. The photographer can photograph the object image while viewing the object image displayed on the external monitoring LCD 122. At the same time, the aforementioned processed image signal of the object image can be written into the image memory 104.

When the mode select member 133 is set to the "image-pickup finder-display mode", position, the main mirror 13 moves upward, and the object image formed via the photographing lens 2 is captured via the image pickup device 10. This object image (image signal) is converted into a digital image signal by the A/D converter 101 and subsequently this digital image signal is subjected to predetermined signal processing in the signal processing circuit 102 to be become a processed image signal. Based on this processed image signal, the CPU 100 drives the EL drive circuit 126 so that the EL display 32 displays an object image. Therefore, the object image is displayed in multiple colors on the focusing screen 12 by the EL display 32, and accordingly, the photographer can photograph the object image while viewing the object image through the pentagonal prism 15 and the eyepiece 16 at a time of exposure. At this time, of course, the object image from the main mirror 13 is not formed on the image forming plate 31.

As described above, providing the digital SLR camera with the focusing screen 12 that incorporates the EL display 32 enables the digital SLR camera to make exposures in a new exposure mode: the image-pickup finder-display mode, in addition to the two conventional exposure modes: the optical image display mode and the image-pickup monitor-display mode, which makes it possible to enhance the convenience of the digital camera at a time of exposure. An exposure mode similar to the above described image-pickup finder-display mode is known in the art. However, to achieve this exposure mode, a technology has been proposed which provides an LCD, which is conventionally used as a monitoring display for displaying images captured via an image pickup device, within a viewfinder optical system so that the photographer can see an image displayed on the LCD through a viewfinder by switching from one optical path of the viewfinder optical system to another. However, this known technique requires a mechanism for switching from one optical path to another, which is disadvantageous to miniaturization of the camera. Unlike this known technique, in the above described digital camera according to the present invention, having the first embodiment of the display screen device, it is advantageous for miniaturization of the camera since the EL display 32 is formed integrally with the focusing screen 12. Additionally, in the above described image-pickup finder-display mode of the present invention, since the photographer carries out exposures using the viewfinder optical system 11 while holding the camera with both hands, the photographer can hold the camera without the need to keep the camera away from the photographer when taking pictures, unlike the case where the photographer takes pictures while viewing an object image displayed on the external monitoring LCD 122, which reduces camera shake.

When the digital camera is in either the optical image display mode or the image-pickup finder-display mode, an object image that is either formed on the focusing screen 12 through the photographing lens 2 or indicated by the EL display 32 of the focusing screen 12 can be simultaneously displayed with visual photographic information (fixed images) such as information on an f-number and a shutter speed in a part of the EL display 32 (e.g., a peripheral part of the EL display 32) which does not interfere with the viewing operation in which the photographer views the object image displayed on the focusing screen 12 through the viewfinder optical system 11.

Even when the digital camera is in the optical image display mode, it is possible to make the EL display 32 indicate a required image only during the time the EL display ON/OFF button 134 is depressed and held. For instance, it is possible to make the EL display 32 indicate only various information when the display ON/OFF button 134 is depressed so that various information are displayed in a peripheral part of the focusing screen 12 for a short period of time by the EL display 32 upon the display ON/OFF button 134 being depressed during the time an optical image of an object is formed on the focusing screen 12 via the photographing lens 2.

Second Embodiment

Figure 6A:
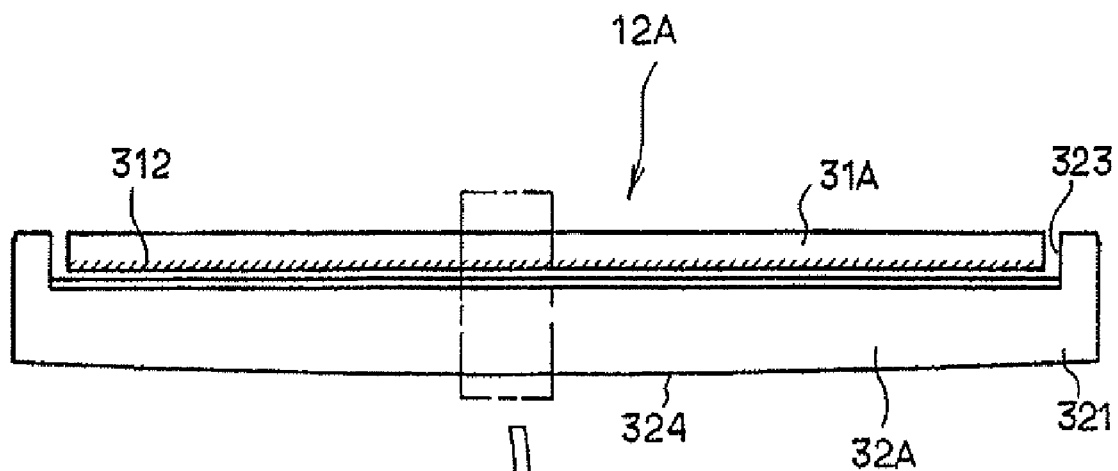
FIG. 6A is a view similar to that of FIG. 4A, showing a second embodiment of the display screen device (focusing screen) according to the present invention.
Figure 6B:
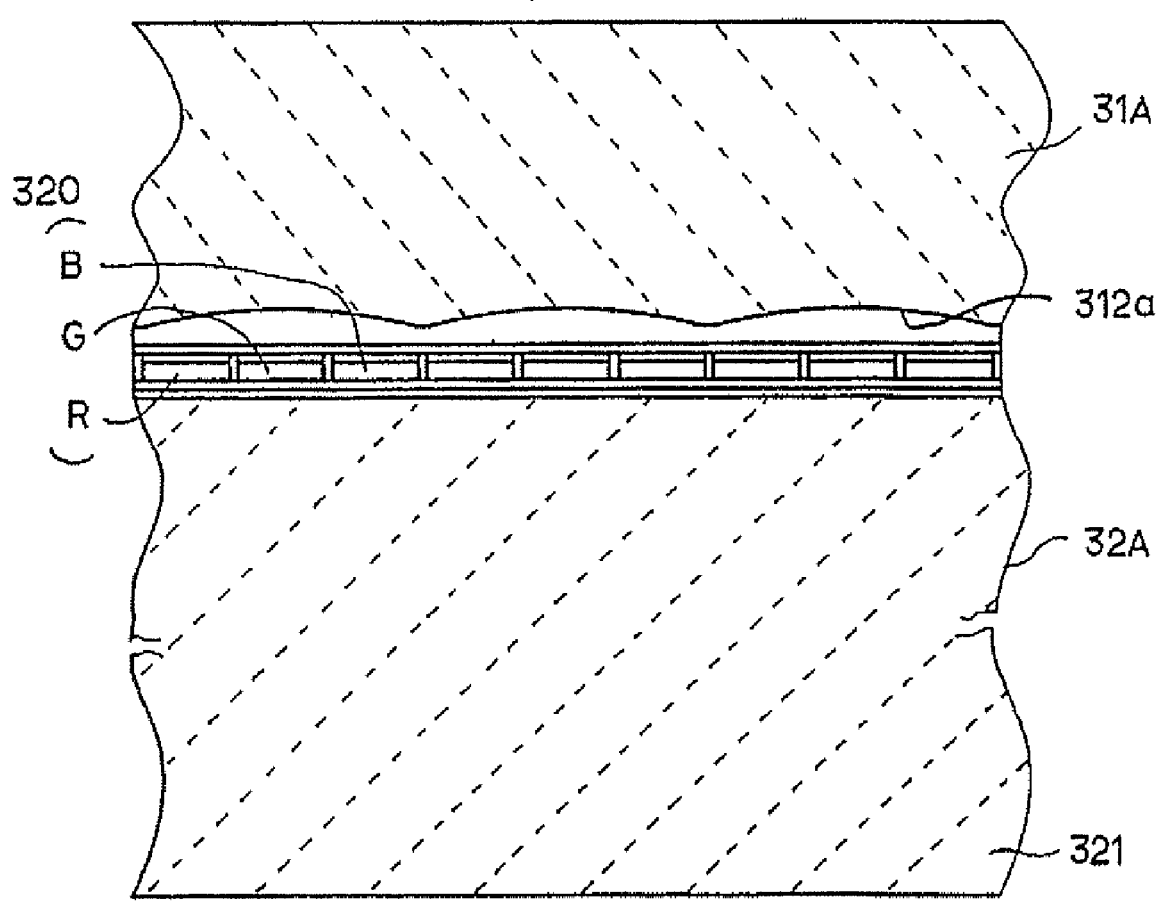
FIG. 6B is an enlarged cross sectional view of a portion of the focusing screen shown in FIG. 6A.

FIG. 6A is a cross sectional view of a second embodiment of the display screen device (focusing screen) according to the present invention, and FIG. 6B is an enlarged cross sectional view of a portion of the second embodiment of the display screen device shown in FIG. 6A. In the second embodiment of the display screen device, portions and elements similar to those in the first embodiment of the display screen device are designated by the same reference numerals. In this embodiment of the focusing screen, a focusing screen 12A that serves as a display screen device is provided with a rectangular EL display 32A and a rectangular image forming plate (display panel/light-transmissive image forming plate) 31A which is formed to extend over substantially the entire back surface (upper surface as viewed in FIGS. 6A and 6B) of the EL display 32A except the peripheral edge of the back surface thereof. The EL display 32A is provided with a rectangular transparent EL substrate (transparent substrate) 321 that serves as a film base of the EL display 32A. The transparent EL substrate 321 is formed thicker than the film base of the EL display 32 of the first embodiment of the display screen device to increase the mechanical strength of the transparent EL substrate 321, and is provided on the back surface thereof except the outer edge thereof with a shallow recess 323. An EL portion 322 made of the aforementioned red (R), green (G) and blue (B) pixels 320 is formed on the inner surface of the recess 323 of the transparent EL substrate 321. A front surface 324 (lower surface as viewed in FIGS. 6A and 6B) of the transparent EL substrate 321 is formed as a lens surface or a Fresnel lens surface. The image forming plate 31A is formed thinner than the image forming plate 31 of the first embodiment of the display screen device, and is embedded in the recess 323 with a light diffusing surface 312 of the image forming plate 31A lying face down, i.e., facing the pixels 320 of the EL display 32A. Similar to the focusing screen 12 shown in FIGS. 4A and 4B, a transparent sealant (not shown) can be filled in the gap between the image forming plate 31A and the transparent EL substrate 321 to seal the gap and to form the image forming plate 31 and the EL display 32 integral with each other as necessary to thereby constitute the focusing screen 12A.

In the digital camera using the second embodiment of the focusing screen 12A, an object image and various information can be displayed on the focusing screen 12A to be viewed through the viewfinder optical system 11 just like in the case of the digital camera using the first embodiment of the focusing screen 12. Moreover, in the digital camera using the second embodiment of the focusing screen 12A, the pixels 320 of the EL portion 322 are resistant to deformation, thus being resistant to damage because the transparent EL substrate 321 is formed thick to have a high mechanical strength, which is effective for enhancing the reliability of the focusing screen 12A. Furthermore, the image forming plate 31A can be replaced by another type of image forming plate.

Third Embodiment

Figure 7A:
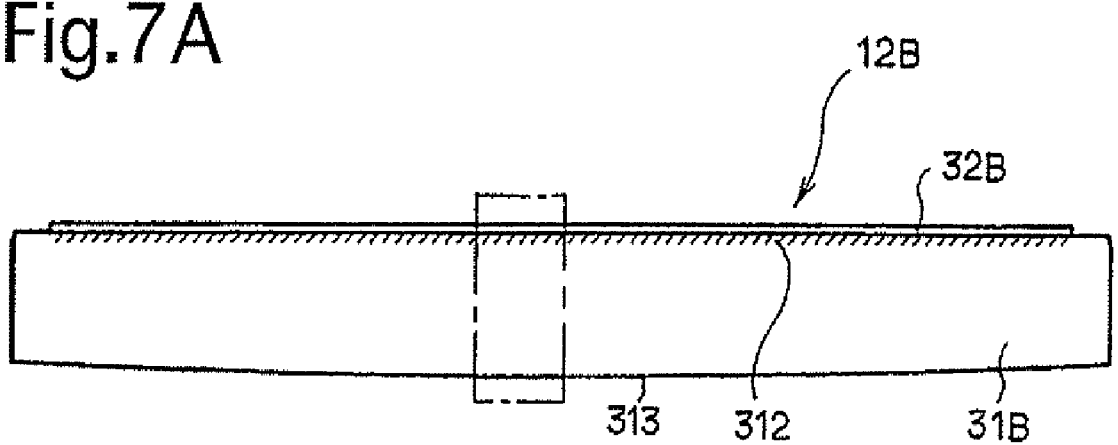
FIG. 7A is a view similar to that of FIG. 4A, showing a third embodiment of the display screen device (focusing screen) according to the present invention.
Figure 7B:
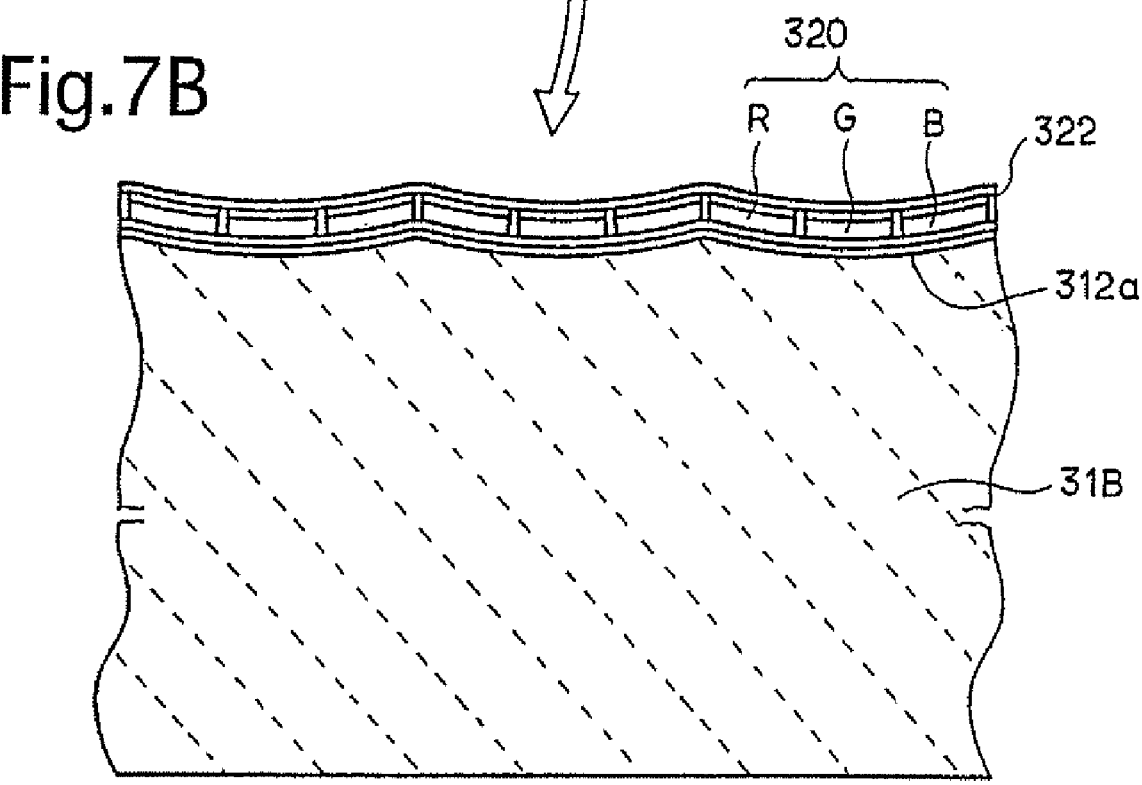
FIG. 7B is an enlarged cross sectional view of a portion of the focusing screen shown in FIG. 7A.

FIG. 7A is a cross sectional view of a third embodiment of the display screen device (focusing screen) according to the present invention, and FIG. 7B is an enlarged cross sectional view of a portion of the third embodiment of the display screen device shown in FIG. 7A. In the third embodiment of the display screen device, portions and elements similar to those in the first embodiment of the display screen device are designated by the same reference numerals. This embodiment of the focusing screen 12B is provided with a rectangular image forming plate (display panel/light-transmissive image forming plate) 31B and an EL display 32B formed on the image forming plate 31B. Specifically, microscopic asperities 312a are formed on a back surface (upper surface as viewed in FIGS. 7A and 7B) of the image forming plate 31B so as to constitute the light diffusing surface 312, while an EL portion 322 made of the aforementioned red (R), green (G) and blue (B) pixels 320 is directly formed on the light diffusing surface 312 to be integral therewith. Namely, the image forming plate 31B is made to also serve as a film base (which corresponds to the transparent EL substrate 321 of the first embodiment of the focusing screen) on which the EL portion 322 is formed.

In the digital camera using the third embodiment of the focusing screen 12B, an object image and various information can be displayed on the focusing screen 12B to be viewed through the viewfinder optical system 11 just like in the case of the digital camera of the first embodiment of the focusing screen 12 or the second embodiment of the focusing screen 12A. In the digital camera using the third embodiment of the focusing screen 12B, it is not necessary to provide the focusing screen with an independent transparent EL substrate which corresponds to the transparent EL substrate 321 of the first or second embodiment of the focusing screen, which simplifies the structure of the focusing screen 12B, makes it possible to reduce the thickness of the focusing screen 12B, and is advantageous for miniaturization of the camera. Moreover, the mechanical strength of the EL display 32B can be increased while the pixels of the EL portion 322 are not easily deformed and thus resistant to damage because the image forming plate 31B itself serves as an EL substrate (which corresponds to the transparent EL substrate 321 of the first or second embodiment of the focusing screen), which is effective for enhancing the reliability of the focusing screen 12B.

Fourth Embodiment

Although the present invention is applied to the focusing screen of an SLR digital camera in the above illustrated first, second and third embodiments, it is possible that the present invention can also be applied to a real-image type of viewfinder optical system of a compact digital camera. Although not shown in the drawings, typical viewfinder optical systems are composed of an objective lens system and an eyepiece lens system, between which a finder frame that visually defines a picture area is disposed, as taught in the aforementioned Japanese unexamined patent publication 2000-137268. Accordingly, an EL display similar to the EL display 32 of the first embodiment of the focusing screen 12 is disposed at a position on an optical axis which is optically equivalent to the position of the finder frame in the area including not only the picture area that is surrounded by the finder frame but also the peripheral area of the picture area, namely, over the area which can be seen through the eyepiece 16. Providing the EL display in the viewfinder optical system and making the EL display indicate an object image captured by the image pickup device makes it possible for the photographer to view an object image which is either formed through the objective lens system or indicated by the EL display through the eyepiece lens system while the photographer still looks into the viewfinder optical system. Accordingly, the photographer can take pictures while viewing an object image and various information through the viewfinder in a manner similar to the digital camera using the first, second or second embodiment of the focusing screen.

The fourth embodiment of the display screen device can also be applied to different optical equipment such as a telescope and binoculars in the same manner. Namely, providing an EL display similar to the EL display 32 of the first embodiment of the focusing screen 12 in a portion of a lens system of a telescope or binoculars and making the EL display indicate a required image as needed makes it possible for the photographer to view an object image which is to be viewed in a manner so that the required image is superimposed on the object image. For instance, the convenience of viewing objects can be enhanced by making the EL display indicate angle information such as a bearing angle, and depression and elevation angles together with scale marks.

Fifth Embodiment

Figure 8:
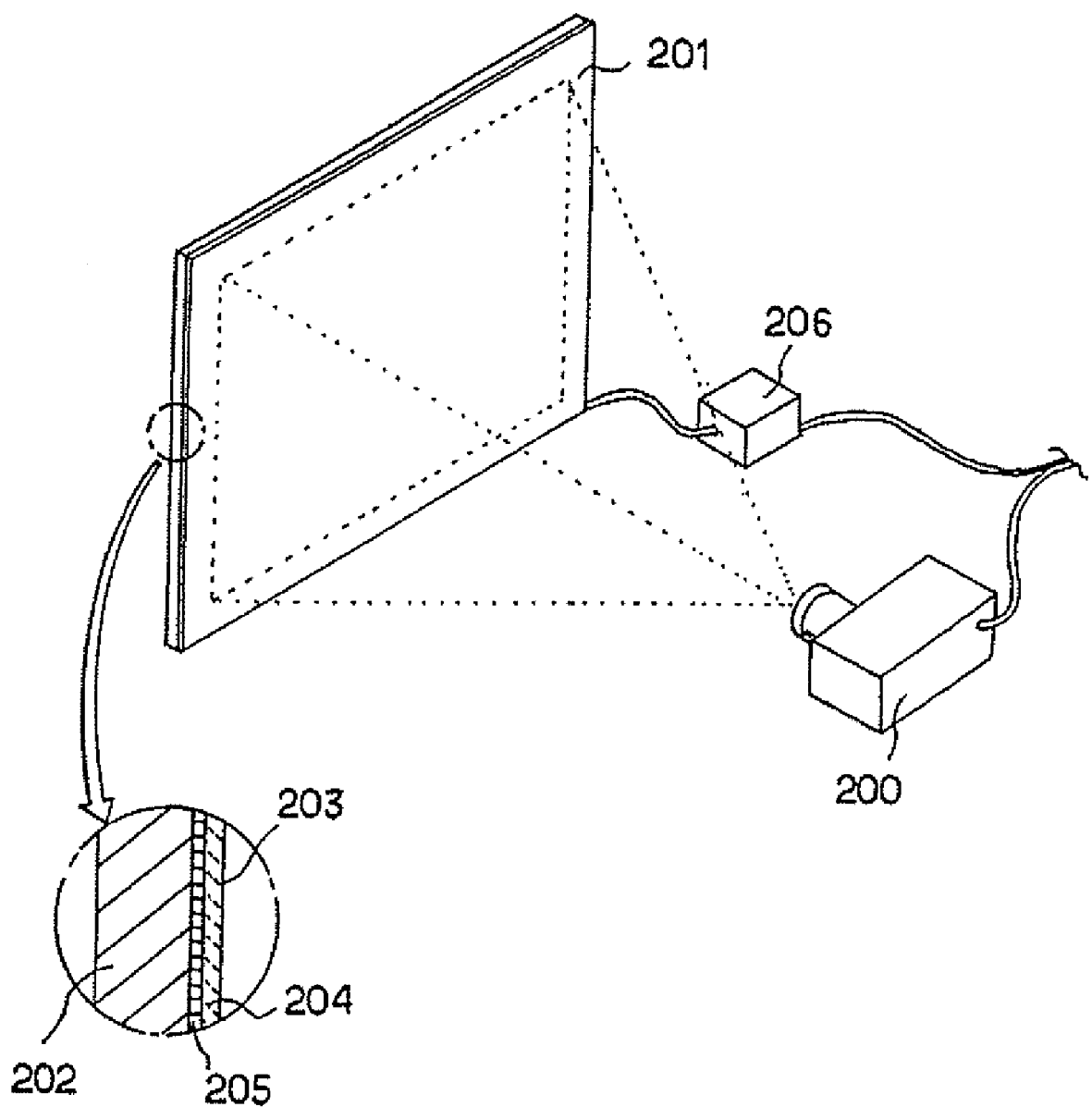
FIG. 8 is a schematic perspective view of a fifth embodiment of the display screen device according to the present invention.

FIG. 8 shows a fifth embodiment of the display screen device according to the present invention. The display screen device according to the present invention can be applied to not only a camera but also a projector type display device such as a projector system shown in FIG. 8. This projector system includes a projector 200, a screen (display screen device) 201 and an EL driving device 206. The screen 201, upon which an image (a still picture or a motion picture) is projected by the projector 200, includes a reflecting screen (display panel) 202 and an EL display 203. The reflecting screen 202 has a white or silver surface, while the EL display 203 is integrally mounted to the reflecting screen 202 to extend over the entire projective surface of the reflecting screen 202. The EL display 203 is made by arranging an EL portion 205, that is made of a matrix of pixels arranged in a plane, on a transparent EL substrate 204 in a manner similar to the EL display of each of the above described first through fourth embodiments. The EL driving device 206 is connected between the projector 200 and the screen 201 to drive the EL display 203.

With this structure, making the EL display 203 indicate a required image in a state where no image is projected onto the screen 201 by the projector 200 makes it possible to display only the required image. Moreover, making the EL display 203 indicate a required image in a state where an image is projected onto the screen 201 by the projector 200 makes it possible to display the required image and the projected image simultaneously in a superimposed manner. This makes it possible to display images in various patterns, thus making it possible to enhance the convenience of the projector system.

Sixth Embodiment

Figure 9:
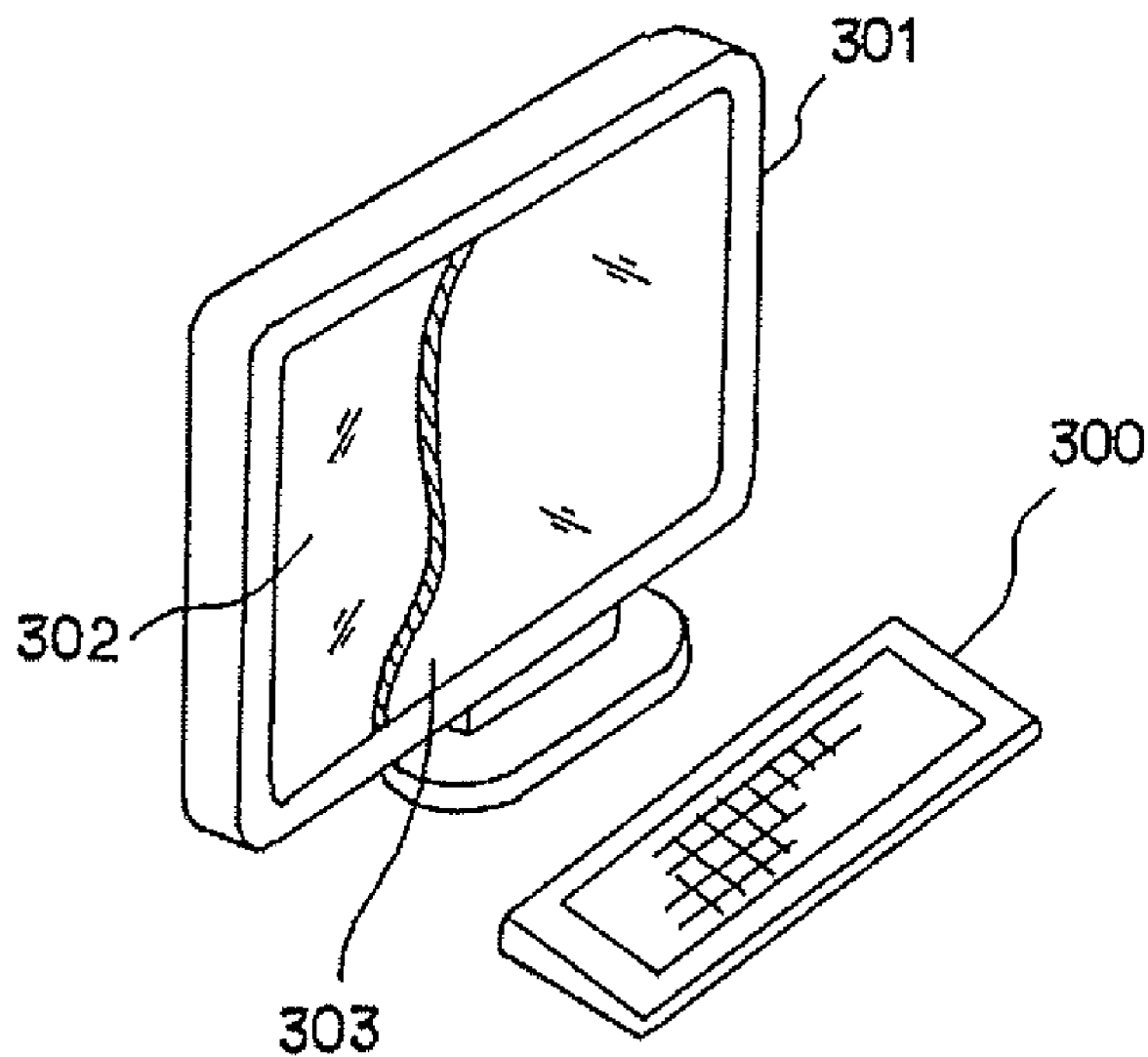
FIG. 9 is a schematic perspective view of a sixth embodiment of the display screen device according to the present invention.

FIG. 9 shows a sixth embodiment of the display screen device according to the present invention. As shown in FIG. 9, an EL display 303 similar to the EL display 32 of the first embodiment of the focusing screen 12 can be integrally formed on a display surface of a display (display monitor/front panel) 301 used for a personal computer 300 or the like, specifically on a surface of an LCD panel (display panel) 302 in this particular embodiment. With this structure, making the EL display 303 indicate a required image in a state where no image is displayed by the LCD panel 302 makes it possible to display only the required image. Moreover, making the EL display 303 indicate a required image in a state where an image is displayed by the LCD panel 302 makes it possible to display these two images simultaneously in a superimposed manner. This makes it possible to display images in various patterns, thus making it possible to enhance the convenience of the display 301. This embodiment is only applicable to television sets, and also to display devices and television sets that are composed of a CRT (cathode-ray tube) or the like.

The present invention is not limited solely to the particular display surface (display screen device) in each of the above described embodiments. An outstanding effect of displaying images in various patterns in a manner similar to each of the above described embodiments can be achieved by disposing an EL display on a display surface of any display screen devices other than the above described embodiments of the display screen devices.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A display screen device, comprising:
light-transmissive image forming plate on which an optical image is formed; and
an electroluminescent display which displays an object image and is positioned to extend substantially entirely over one surface of said light-transmissive image forming plate so that said optical image and said object image can be selectively displayed and so that said optical image and said object image can be displayed in a superimposed manner,
wherein said light-transmissive image forming plate is formed to serve as an element of a focusing screen of a camera,
wherein said camera comprises an image pickup device for capturing the object image formed via a photographing lens and displayed on the electroluminescent display.

2. The display screen device according to claim 1, wherein said electroluminescent display is formed on a transparent substrate so as to constitute a color display.

3. The display screen device according to claim 1, wherein said electroluminescent display is transparent when no voltage is applied thereto.

4. The display screen device according to claim 3, wherein an image forming surface of said light-transmissive image forming plate on which said optical image is formed is roughened to serve as a light-diffusing surface, and
wherein said electroluminescent display is in contact with said light-diffusing surface.

5. The display screen device according to claim 3, wherein an image forming surface of said light-transmissive image forming plate on which said optical image is formed is roughened to serve as a light-diffusing surface, and
wherein said electroluminescent display is integrally formed with said light-diffusing surface.

6. The display screen device according to claim 1, wherein said light-transmissive image forming plate comprises one of a lens element and a prism that serve as optical elements of a viewfinder optical system of said camera.

7. The display screen device according to claim 1, wherein said light-transmissive image forming plate comprises a front panel of a display monitor.

8. The display screen device according to claim 1, wherein said light-transmissive image forming plate has a recess, a inner surface of which is formed to be a light-diffusing surface,
wherein said electroluminescent display is formed on a transparent substrate so as to comprise a color display, said transparent substrate being embedded in said recess with said electroluminescent display facing said light-diffusing surface.

* * * * *